(12) United States Patent
Weber et al.

(10) Patent No.: US 10,932,623 B2
(45) Date of Patent: Mar. 2, 2021

(54) ELECTRICALLY OPERABLE KITCHEN APPLIANCE

(71) Applicant: Vorwerk & Co. Interholding GmbH, Wuppertal (DE)

(72) Inventors: Klaus-Martin Weber, Wuppertal (DE); Torsten Lang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 455 days.

(21) Appl. No.: 15/544,959

(22) PCT Filed: Jan. 21, 2016

(86) PCT No.: PCT/EP2016/051226
§ 371 (c)(1),
(2) Date: Jul. 20, 2017

(87) PCT Pub. No.: WO2016/116557
PCT Pub. Date: Jul. 28, 2016

(65) Prior Publication Data
US 2018/0014694 A1    Jan. 18, 2018

(30) Foreign Application Priority Data
Jan. 21, 2015    (DE) ..................... 10 2015 100 858.0

(51) Int. Cl.
*A47J 43/07*     (2006.01)
*A47J 31/44*     (2006.01)

(52) U.S. Cl.
CPC ......... *A47J 43/075* (2013.01); *A47J 43/0716* (2013.01); *A47J 31/4407* (2013.01)

(58) Field of Classification Search
None
See application file for complete search history.

(56) References Cited

U.S. PATENT DOCUMENTS 3,276,497 A    10/1966 Heer
2005/0141681 A1*  6/2005 Graiger ................ G05B 19/409
                                                        379/90.01

(Continued)

FOREIGN PATENT DOCUMENTS

AT        252 488 B     2/1967
CN     102 087 510 A    6/2011

(Continued)

OTHER PUBLICATIONS

International Search Report of PCT/EP2016/051226, dated Apr. 25, 2016.

*Primary Examiner* — Ibrahime A Abraham
*Assistant Examiner* — John J Norton
(74) *Attorney, Agent, or Firm* — Collard & Roe, P.C.

(57) ABSTRACT

The invention relates to an electrically operatable kitchen device for preparing food by means of one or more effective devices. An effective device can be activated and/or adjusted by a rotary knob and/or push button, and the kitchen device can be deactivated in terms of one or simultaneously more or all of the activated effective devices. The aim of the invention is to provide an electrically operatable kitchen device with an advantageously deactivatable effective device. According to the invention, this is achieved in that the deactivation of the effective device can be triggered depending on the speed at which the rotary knob is moved in the direction of the rotational axis of the rotary knob, in the rotational direction, or in the opposite rotational direction.

4 Claims, 5 Drawing Sheets

(56) References Cited

U.S. PATENT DOCUMENTS

2012/0293431 A1 11/2012 Hauf
2013/0307799 A1 11/2013 Hauf
2016/0094700 A1* 3/2016 Lee ..................... H04W 8/245
　　　　　　　　　　　　　　　　　　　455/419

FOREIGN PATENT DOCUMENTS

| DE | 10 2010 025 237 A1 | 4/2011 |
| EP | 2 525 268 A1 | 11/2012 |
| EP | 2 574 261 A2 | 4/2013 |
| EP | 2 664 971 A1 | 11/2013 |

* cited by examiner

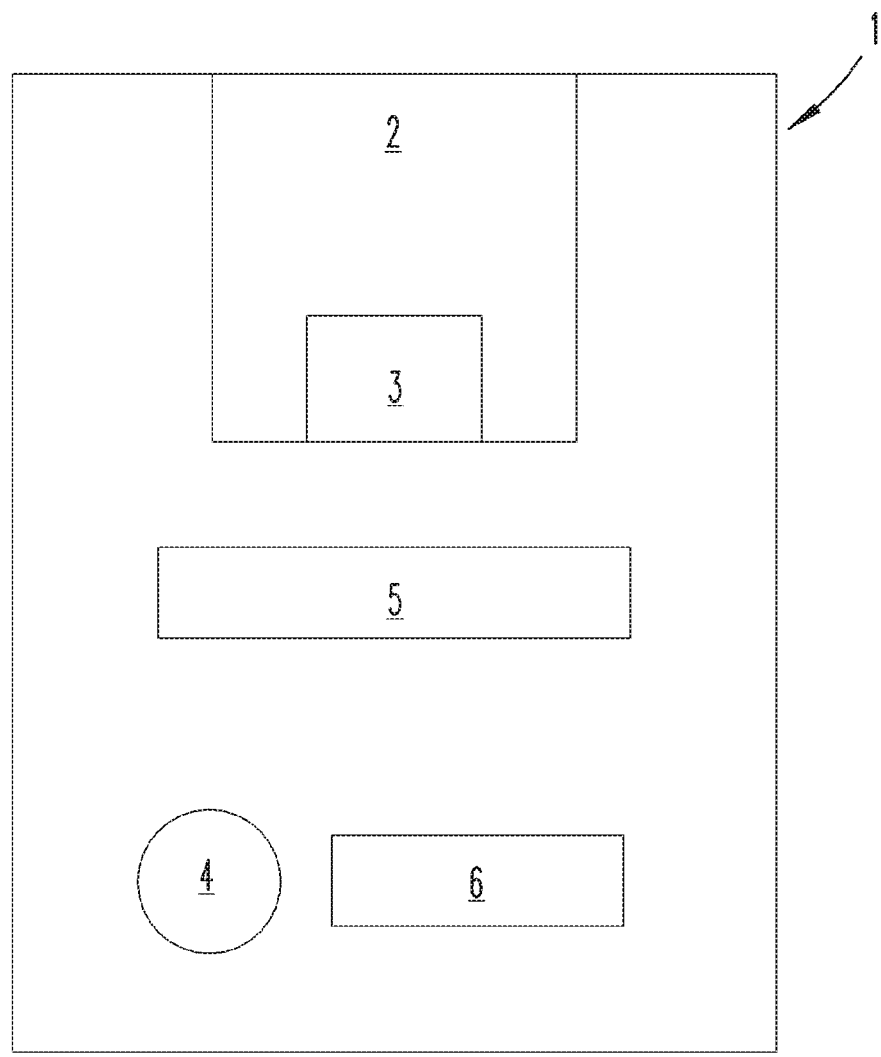

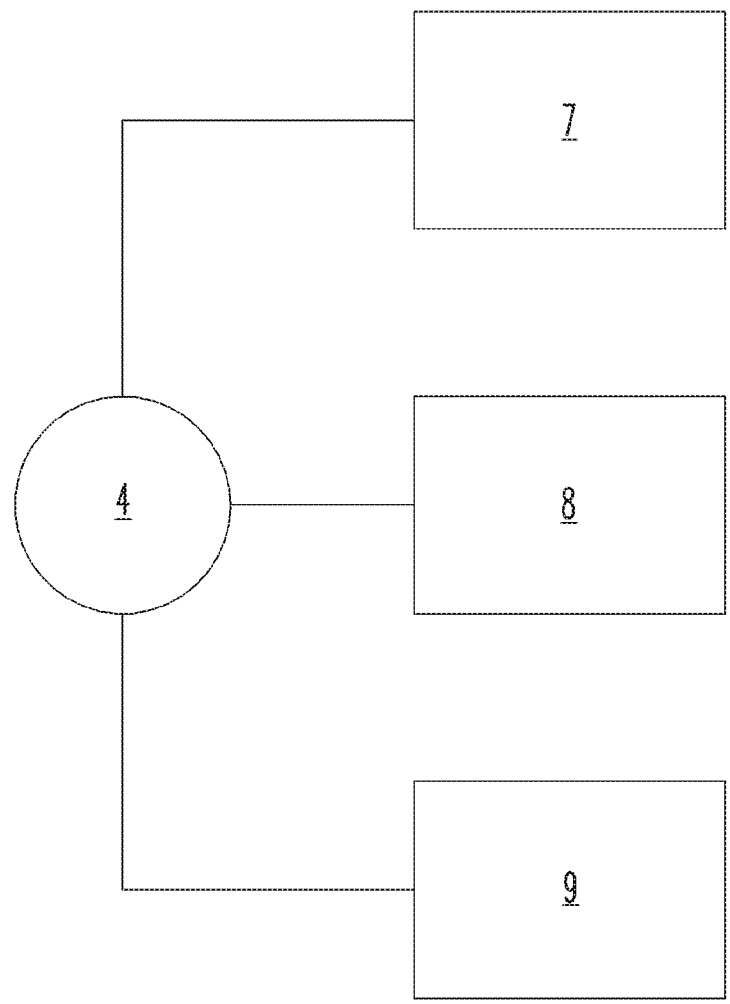

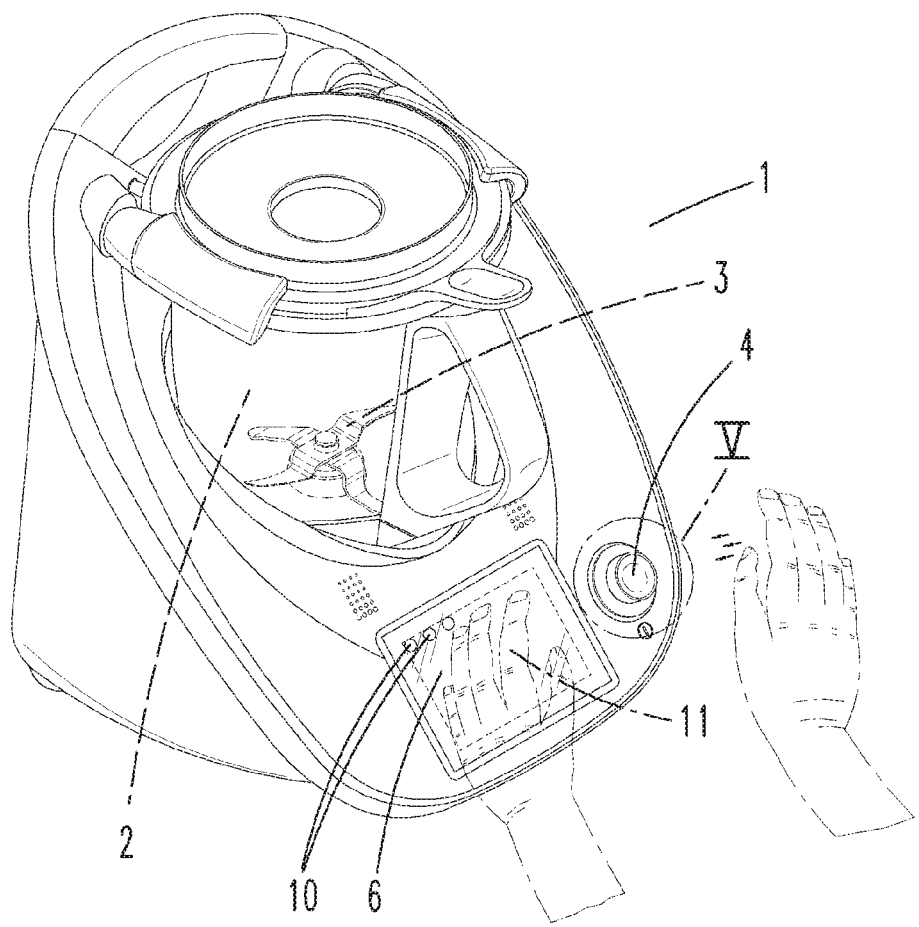

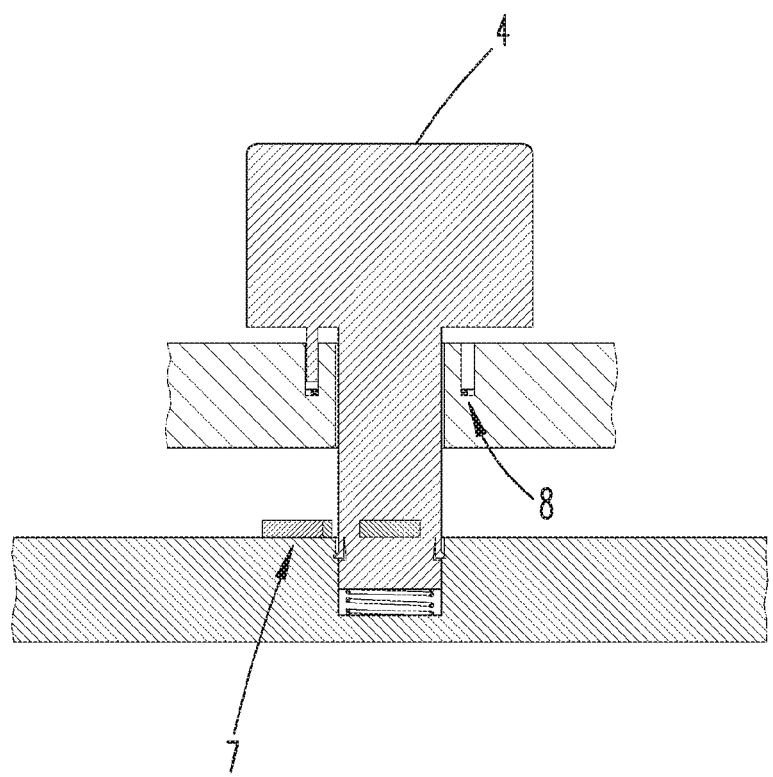

ELECTRICALLY OPERABLE KITCHEN APPLIANCE

CROSS REFERENCE TO RELATED APPLICATIONS

This application is the National Stage of PCT/EP2016/051226 filed on Jan. 21, 2016, which claims priority under 35 U.S.C. § 119 of German Application No. 10 2015 100 858.0 filed on Jan. 21, 2015, the disclosures of which are incorporated by reference. The international application under PCT article 21(2) was not published in English.

The invention relates to an electrically operable kitchen appliance for preparing foodstuffs by means of one or more processing devices, whereby a processing device can be activated and/or adjusted by means of a rotary knob and/or a push-button, and the kitchen appliance can be shut down with respect to one, or simultaneously a plurality or all, of the activated processing devices.

Such kitchen appliances are well known in practice, e.g. in the form of universal kitchen machines, whereby these electrical kitchen appliances, in addition to the mechanical processing of foodstuffs, e.g. by means of an agitator or a cutting blade, often also enable the foodstuff to be cooked. For the preparation of an appropriate dish, predefined recipes are as a general rule provided, which have a plurality of successive recipe steps.

A kitchen appliance can have one or a plurality of processing devices, which can consist in particular of an agitator or a heating device.

In order to enable the user of such an electrical kitchen appliance to prepare a dish according to such a predefined recipe, but also to control the electrical kitchen appliance with its functions directly, such appliances as a rule have an adjustment device to enable the user to adjust the processing functions. Here such adjustment devices are typically integrated into the electrical kitchen appliance, e.g. in the form of input buttons, rotary controls, or also in the form of a touch screen.

As a result of a rotating cutting blade, but also because of highly heated foodstuffs, such an electrical kitchen appliance can represent a risk to the user or other persons present in the vicinity of the electrical kitchen appliance. To enable the electrical kitchen appliance to be rapidly shut down in such a risky situation, the electrical kitchen appliance can have an emergency stop switch.

As a general rule such an emergency stop switch enables the electrical kitchen appliance to be shut down immediately in order to eliminate immediately the risk represented by the electrical kitchen appliance, e.g. as a result of the rotating cutting blade. However, such an emergency stop switch requires the fitting of an additional control element to the electrical kitchen appliance, which is time-consuming and involves additional costs. Moreover, such an emergency stop switch is also undesirable in terms of aesthetic and ergonomic aspects.

An electrically operated kitchen appliance is of known art from AT 252488 B, in which an electrically driven rotating cutting blade can be shut down by means of a switching element configured as a rotary element, whereby an emergency or rapid deactivation of the drive can be carried out in terms of an axial movement of the rotary element.

Starting from the prior art as described above, the invention is concerned with the task of specifying an electrically operable kitchen appliance with a beneficial shut-down capability of the processing device.

This object is achieved by the subject matter of claim 1, whereby the aim is that a shut-down of the processing device can be triggered as a function of the speed at which the rotary knob is moved in the direction of its axis of rotation, or in the rotational direction, or in the opposite rotational direction. In accordance with the invention, not only is an adjustment in the axial direction of the rotary knob used as a criterion for an emergency deactivation, but also the speed with which this adjustment is carried out in the axial direction, or alternatively in the direction of rotation, or in the opposite direction of rotation. By this means, any accidental impact on the rotary knob with the consequence of a movement in the axial direction, or a conventional rotation of the rotary knob in the direction of rotation or the opposite direction of rotation, can be ruled out as a trigger for an emergency deactivation. The adjustment device of the electrical kitchen appliance, here in the form of the rotary knob, is provided with a double function: on the one hand, the adjustment device, as in conventional electrical kitchen appliances, serves for the adjustment by the user of at least one of the processing functions, on the other hand, the rotary knob and/or push-button is also designed in such a way as to enable the processing device to be deactivated, in particular in the sense of an emergency deactivation. In addition, a conventional deactivation can also be provided, for example, by moving the rotary knob into a certain end position that can be locked, or by actuating a master switch, or similar.

Two functional classes of adjustments are combined with each other by means of the rotary knob and/or push-button. The provision of an additional, separate emergency stop switch is not required.

These different functional classes can be detected in a completely different manner by the corresponding actuation of the rotary knob and/or push-button. In accordance with a preferred development of the invention, provision is made for the rotary knob and/or push-button to have a first detection device for detecting a first input parameter, and a second detection device for detecting a second input parameter, whereby the first input parameter differs from the second input parameter, and the processing device can be adjusted by means of the first detection device, for example with regard to heat generation, rotational speed, or similar, and the shut-down, in particular the emergency stop function, can be activated by means of the second detection device. This preferred development of the invention thus provides for the rotary knob and/or push-button to be provided with a plurality of detection devices for purposes of detecting different input parameters, whereby these different input parameters are used, on the one hand, for adjusting the processing function, that is to say, for an adjustment to a processing device, and on the other hand for the activation of the deactivation procedure, the emergency stop function.

In principle, it is also possible for only one detection device to be provided, which outputs different switching signals with regard to a detected speed of rotation of the rotary knob, or outputs different switching signals with regard to an axial speed that is detected. At a first rotational speed that is located within a first speed range, and/or at a first axial speed that is located within a first axial speed range, the detected speed can be interpreted by the appliance as a conventional adjustment of a processing device and, at a second rotational speed, which is located within a second, higher, speed range, and/or at a second axial speed, which is located within a second, higher, axial speed range, a detected speed can be interpreted by the appliance as a deactivation procedure, in particular an emergency deactivation procedure.

With regard to a movement of the rotary knob and/or push-button in an axial direction, in the direction of the axis of rotation in the case of a rotary knob, not only can the speed with which the button is pressed and moves accordingly in the axial direction be a measure, but also the applied impulse, that is to say, the product of the mass of the knob and the speed with which it is pressed in the axial direction.

In this context, it is particularly preferable for a second input parameter to be a property of the adjustment of a first input parameter by the user. This means that in accordance with this preferred development the second input parameter depends on how the first input parameter is adjusted by the user. Thus, if the first input parameter is e.g. formed by pressing a push-button, the second input parameter can preferably be specified by how forcefully the button is pressed by the user.

In this context, in accordance with a further preferred development of the invention, provision is made for the adjustment device to have a push-button and a force measuring device for purposes of detecting the force exerted on the push-button by the user, and for the shut-down procedure or emergency stop function to be capable of being activated when exceedance of a predefined force, the shut-down force or emergency stop force, is detected. This means therefore, that the push-button, with which on other occasions a processing function, i.e., in physical terms a processing device of the electrical kitchen appliance, can be adjusted, is also pressed for activation of the deactivation procedure or emergency stop function, but only in a certain manner, namely, with such force and/or so quickly that the predefined deactivation force or emergency stop force and/or deactivation speed or emergency stop speed is exceeded, so that the deactivation function or emergency stop function is activated.

In particular, it is also preferred that, by actuation of the one rotary switch in the described manner, where necessary a plurality of processing devices that are activated at the same time, that is to say, for example, an agitator and a heating device, are shut down, preferably in the sense of an emergency shut-down.

In particular, provision can also be made that as a consequence of such an actuation, power is completely removed from the kitchen machine. In the case of such a shut-down procedure, in particular an emergency shut-down, it can be accepted that certain data are lost, or that other safety routines are not carried out in the course of the shut-down.

Thus, from the manner in which a user operates the adjustment device, which is already provided for the adjustment of a processing function, in physical terms a processing device, it is detected as to whether the emergency stop function should be activated. This makes it possible to use one and the same adjustment device for two completely different adjustment purposes, namely for the regular adjustment of a processing function, or in physical terms, a processing device of the electrical kitchen appliance, and also for its shut-down, in particular an emergency shut-down.

In accordance with a further preferred development of the invention, provision is made that in the case in which the adjustment device has a push-button, an impulse measuring device is provided for purposes of detecting the impulse exerted on the push-button by the user, and the emergency stop function, or a shut-down as such, can be activated when exceedance of a predefined emergency stop impulse (shut-down impulse), is detected. This preferred development of the invention is similar to that described above, whereby as an alternative to the force exerted on the push-button by the user, here it is the impulse exerted by the user that is detected.

In principle, the push-button can be a button of the type that can simply be pressed to generate the functions in question, e.g. by the selection of a menu point displayed on a display device. However, the push-button is preferably a push/turn button, that is to say, a button of the type in which various functions can be triggered or controlled not only by means of pressing, but also by means of rotation. This increases further the functionality of the adjustment device without the need for the provision of additional devices, such as further buttons.

In accordance with a further development of the invention, provision is made for the adjustment device to have a touch screen in addition to the push/turn knob as a user interface, but no other user interfaces. It has been shown that by means of a combination of a push/turn knob and a touch screen as the only user interfaces, the user can be provided with elegant and clear operating and adjustment options.

This combination of a push/turn knob and a touch screen is distinguished by the fact that it is not only easy to operate, but also facilitates the cleaning of the electrical kitchen appliance. When the electrical kitchen appliance is in use, it will in general not be possible to prevent foodstuffs, at least in small quantities, from reaching not only a processing volume of the electrical kitchen appliance, but also the housing of the electrical kitchen appliance or the adjustment device. In this respect, it is advantageous if the adjustment device has as few raised elements as possible.

In an adjustment device that has a touch screen, provision is made in accordance with a preferred development of the invention for the emergency stop function to be able to be activated by means of a form of touching of the touch screen by the user in which the surface area coverage of the touch screen exceeds a predefined emergency stop surface area coverage. In other words, the emergency stop function is activated by a form of touching of the touch screen by the user that differs from regular touching of the touch screen for purposes of adjusting a processing function, in that a considerably higher surface area coverage of the touch screen takes place, namely one that goes beyond the predefined emergency stop surface area coverage. The emergency stop surface area coverage is preferably dimensioned such that it is larger than the area that can be covered by two fingertips of a typical user. To this end, a predefined emergency stop surface area coverage is defined and stored as an absolute size of surface area. The emergency stop surface area coverage or area size is, for example, approximately 2 cm$^2$ in size, and is preferably larger than a fingerprint.

Finally, for all the above-described preferred developments of the invention it applies that the emergency stop function preferably effects an immediate shut-down of the electrical kitchen appliance, without an orderly power-down or deactivation of the electrical kitchen appliance. Since any immediate risk caused by the electrical kitchen appliance should be eliminated by means of the emergency stop function, an orderly power-down of the system of the electrical kitchen appliance, or deactivation, is preferably dispensed with, whilst accepting that any recipe that is currently being processed is thereby interrupted and possibly must be started completely from the beginning.

In what follows, the invention is described in detail with reference to the figures. In the figures FIG. 1 shows schematically the makeup of an electrical kitchen appliance in accordance with a preferred example of embodiment of the invention;

FIG. 2 shows schematically details of the push/turn button of the electrical kitchen appliance in accordance with a preferred example of embodiment of the invention;

FIG. 4 shows a physical illustration of an electrical kitchen appliance; and

FIG. 5 shows a cross-sectional illustration of a push/turn button of the kitchen appliance.

Figure 3A:
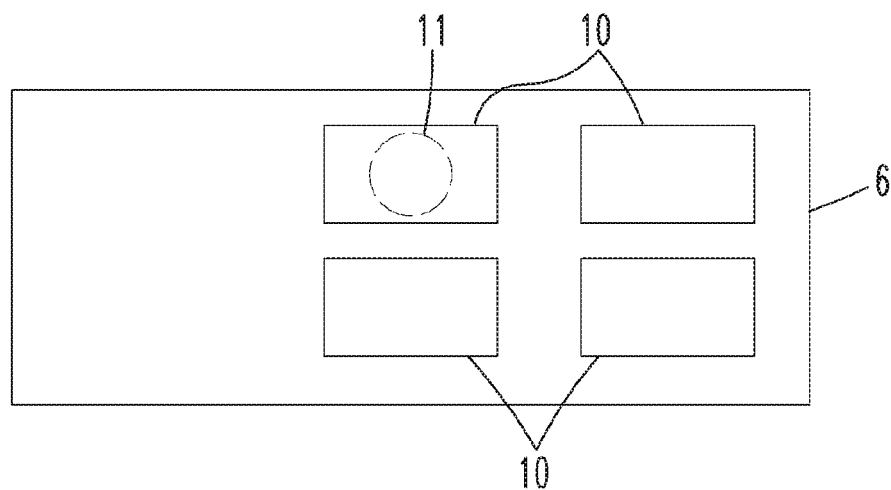
FIGS. 3a, 3b show details of the touch screen of the electrical kitchen appliance in accordance with a preferred example of embodiment of the invention.

FIG. 1 shows an electrical kitchen appliance in accordance with a preferred example of embodiment of the invention with its essential components for the present invention. The electrical kitchen appliance 1 has a processing volume 2 in which foodstuffs can be processed, in particular by means of processing functions that can be adjusted by a user. For the processing of the foodstuffs, an agitating and cutting unit 3 is provided in the processing volume 2, with which the foodstuffs in the processing volume 2 can be agitated, kneaded and/or reduced in size to produce the dish.

Control of the electrical kitchen appliance 1 is undertaken by means of a central control unit 5 (CPU). Commands to be input into the electrical kitchen appliance 1 by the user, that is to say the adjustment of processing functions, are performed in accordance with the currently described preferred embodiment of the invention by means of a push/turn knob 4 and a touch screen 6. By means of the push/turn knob 4, the displays on the touch screen 6 can be changed; certain functions can be selected by tapping the touch screen 6, and a selected input can be actuated by pressing the push/turn knob 4.

In order to detect such a push or turn of the push/turn knob 4, the latter is provided, as shown schematically in FIG. 2, with a pressure detection device 7 and a rotation detection device 8. Here the pressure detection device 7 determines whether the push/turn knob 4 has been pressed, and the rotation detection device 8 determines in which direction and how far the push/turn knob 4 has been rotated. This information is combined with the display information from the touch screen in the central control unit 5, such that the electrical kitchen appliance 1 can detect which adjustments the user has made via the push/turn knob 4 and the touch screen 6.

In addition to the pressure detection device 7 and the rotation detection device 8, in accordance with the currently described preferred embodiment of the invention the push/turn button 4 of the electrical kitchen appliance 1 is also provided with a force detection device 9. With this force detection device 9, it is possible to detect with what force the push/turn knob 4 is pressed by the user. This information is also passed on to the control unit 5 where it is stored, from which detected force any exceedance of a predefined emergency force is to be taken on board.

If, therefore, a higher force applied to the push/turn knob 4 by the user than the emergency stop force is detected by means of the force detection device 9, an emergency stop function is activated for the electrical kitchen appliance 1. The emergency stop function means that the electrical kitchen appliance 1 is shut down immediately, in particular without the systems of the electrical kitchen appliance 1 being powered down in an orderly manner. This ensures that as a result of activation of the emergency stop function no further risk can originate from the operation of the electrical kitchen appliance 1.

Thus the push/turn knob 4 has a double function, in that it can be used not only for inputting or confirming processing functions for the electrical kitchen appliance 1, but also for activating an emergency stop function of the electrical kitchen appliance 1. In this manner, for the electrical kitchen appliance 1 in accordance with the preferred example of embodiment of the invention, it is possible to avoid the need to provide a separate emergency stop switch that is separate from the push/turn knob 4. This reduces the number of operating elements on the electrical kitchen appliance 1, which is advantageous in terms of aesthetic and ergonomic aspects.

However, in the electrical kitchen appliance 1 in accordance with the currently described preferred embodiment of the invention, there is also a second option for the activation of the emergency stop function. This will be explained below with reference to FIGS. 3a, 3b and 4.

FIG. 3a shows schematically how, on the touch screen 6, display panels 10 are shown with which various selectable functions of the electrical kitchen appliance 1 are presented to the user. By means of a dashed circle, the cover 11 of the touch screen 6 is shown schematically with one finger of the user, in order to tap on one of the display fields 10 and in this manner to select the associated function. The coverage 11 with one finger is always such that for a typical user a certain surface area coverage is not exceeded when the touch screen 6 is touched.

Figure 3B:
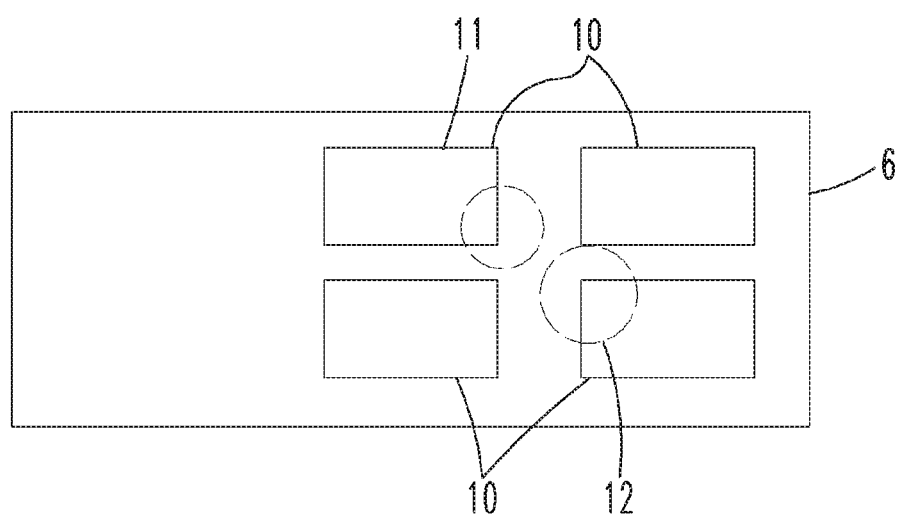

Connected therewith is now the principle of providing an emergency stop function by means of the touch screen 6 of the electrical kitchen appliance 1. As shown in FIGS. 3b and 4, the touch screen 6 can also be touched with more than one finger. In FIG. 3b, in addition to the coverage 11 with a first finger, coverage 12 with a second finger is also shown. These touches of the touch screen 6 no longer serve the purpose of selecting a specific display field 10. Instead the emergency stop function of the electrical kitchen appliance 1 is to be activated by touching the touch screen 6 with more than one finger, in the present case with two fingers.

If the entire area of the touch screen, which has the ability to respond to touch, for example by one finger, is set to 100, then it is preferable if a touch of a proportion of 6 or more, whereby here all integer higher values, i.e., 7 or more, 8 or more, etc., are included in the disclosure, whereby the limit is set at 100, is sufficient for the triggering of the said shut-down, in particular for the emergency deactivation.

For this purpose, it is absolutely irrelevant where the fingers touch the touch screen 6, that is to say, which display fields 10 are tapped, or whether one or more of the display fields 10 are touched at all. Rather, in the central control unit 5, which is supplied with the information for touching the touch screen 6, it is laid down that the emergency stop function of the electrical kitchen appliance 1 is activated if the detected surface area coverage of the touch screen 6 exceeds a predefined emergency stop surface area coverage. In the present case, provision is made for the fact that such an exceedance of the predefined emergency stop surface area coverage takes place if a surface area coverage of the touch screen 6 is detected, which corresponds to two or more fingers. For this purpose, a surface area of, for example, 2 $cm^2$ for an emergency stop surface area coverage is stored as an absolute value in the central control unit 5. This surface area coverage, or the figure required for this purpose, as a general rule is preferably preset in the factory for the electrical kitchen appliance 1.

FIG. 5 shows a cross-sectional illustration of a push/turn button. Furthermore, a detection device for a rotational movement in the direction of rotation and/or a movement in the axial direction of the axis of rotation is shown schematically with the reference symbol 7. The device illustrated can detect both a conventional rotational speed in a rotational speed range, as well as a second rotational speed that can be interpreted with regard to a deactivation, in particular an emergency deactivation, in a second rotational speed range, and additionally or alternatively can detect a first axial speed that can lead, for example, to a conventional shut-down of the kitchen appliance, that is to say, with the powering down of open programs, etc., and can detect a second axial speed in a second axial speed range, which can lead to an emergency stop.

LIST OF REFERENCE SYMBOLS

1 Electrical kitchen appliance
2 Processing volume
3 Agitating and cutting unit
4 Push/turn button
5 Central control unit
6 Touch screen
7 Pressure detection device
8 Rotation detection device
9 Force detection device
10 Display fields
11 Coverage with a first finger
12 Coverage with a second finger

The invention claimed is:

1. An electrically operable kitchen appliance for preparing foodstuffs by means of one or more processing devices, wherein
the one or more processing devices can be activated and/or adjusted by a push/turn button, and the kitchen appliance can be shut down with respect to one, or simultaneously a plurality or all, of the activated processing devices,
wherein the shut-down of the one or more processing devices can be triggered as a function of a speed with which the push/turn button is moved in the direction of its axis of rotation, or in the rotational direction, or in the opposite rotational direction.

2. An electrical kitchen appliance for processing foodstuffs by means of processing functions in the form of mechanical processing of foodstuffs by means of an agitator or cutting blade, or cooking of foodstuffs, that can be adjusted by a user, comprising an adjustment device configured for adjusting at least one of the processing functions by the user, and for providing an activation of an emergency stop function by the user,
wherein the adjustment device comprises a touch screen (6), configured for activating the emergency stop function by means of a touching of the touch screen (6) by the user, in which a surface area coverage (11, 12) of the touch screen by the user exceeds a predefined emergency stop surface area coverage,
wherein the adjustment device further comprises a push/turn button (4) configured for changing displays on the touch screen and selecting an input for a function displayed on the touch screen, a first detection device (7) configured for detecting a first input parameter in the form of a pressing of the push/turn button (4), and a second detection device (9) configured for detecting a second input parameter in the form of a speed at which the push/turn button (4) is turned by the user,
wherein the first input parameter differs from the second input parameter, and the first detection device (7) is configured for adjusting the processing functions related to heat generation or rotational speed for processing foodstuffs, and the second detection device (9) is configured for activating the emergency stop function when a rotational speed of a turning of the push/turn button is within a predetermined emergency stop rotational speed that is different from a rotational speed used to adjust the processing functions.

3. The electrically operable kitchen appliance in accordance with claim 2, wherein the adjustment device, in addition to the push/turn button (4), only has the touch screen (6) as a user interface.

4. The electrically operable kitchen appliance in accordance with claim 2, wherein the emergency stop function effects an immediate shut-down of the electrically operable kitchen appliance (1), without an orderly power-down of the electrically operable kitchen appliance (1).

* * * * *